United States Patent
Wang et al.

(10) Patent No.: US 12,022,520 B2
(45) Date of Patent: Jun. 25, 2024

(54) UPLINK RESOURCE ALLOCATION METHOD AND DEVICE, BASE STATION, AND TERMINAL

(71) Applicant: DATANG MOBILE COMMUNICATIONS EQUIPMENT CO., LTD., Beijing (CN)

(72) Inventors: Lei Wang, Beijing (CN); Yanping Xing, Beijing (CN); Tony Ekpenyong, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 665 days.

(21) Appl. No.: 17/260,021

(22) PCT Filed: Jul. 3, 2019

(86) PCT No.: PCT/CN2019/094503
§ 371 (c)(1),
(2) Date: Jan. 13, 2021

(87) PCT Pub. No.: WO2020/011078
PCT Pub. Date: Jan. 16, 2020

(65) Prior Publication Data
US 2021/0315019 A1    Oct. 7, 2021

(30) Foreign Application Priority Data
Jul. 13, 2018 (CN) .......................... 201810770374.X

(51) Int. Cl.
*H04W 74/0833* (2024.01)
*H04W 72/0453* (2023.01)
*H04W 72/1268* (2023.01)

(52) U.S. Cl.
CPC ... *H04W 74/0833* (2013.01); *H04W 72/0453* (2013.01); *H04W 72/1268* (2013.01)

(58) Field of Classification Search
CPC ... H04W 4/70; H04W 72/04; H04W 72/1268; H04W 74/008; H04W 74/0833; H04W 72/0453
See application file for complete search history.

(56) References Cited

U.S. PATENT DOCUMENTS 11,284,420 B2 *   3/2022   Lin .................. H04W 72/04
2019/0387546 A1 *  12/2019   Li .................... H04L 27/26132
(Continued)

FOREIGN PATENT DOCUMENTS

CN    102740447 A      10/2012
EP    3826407 A1 *    5/2021    ......... H04L 27/2602
(Continued)

OTHER PUBLICATIONS

3GPP TSG-RAN WG2 Meeting #101, R2-1802441, 10.3.1.4.3 (NR_newRAT-Core), Issues on CBRA in BWP Operation, LG Electronics, Feb. 26-Mar. 2, 2018 (Year: 2018).*

(Continued)

*Primary Examiner* — Matthew C Sams
(74) *Attorney, Agent, or Firm* — Harness, Dickey & Pierce, P.L.C.

(57) ABSTRACT

An uplink resource allocation method, an uplink resource allocation device, a base station and a terminal are provided. The uplink resource allocation method includes determining resource allocation information of an msg3 in a CBRA process. The resource allocation information is determined by the base station in accordance with a predefined rule; or the resource allocation information is configured by the base station, and notified by the base station to the terminal. When the resource allocation information is determined in accordance with the predefined rule, a same predefined rule is used by the base station and the terminal.

15 Claims, 4 Drawing Sheets determining resource allocation information of an msg3 in a CBRA process, wherein the resource allocation information is determined by a base station in accordance with a predefined rule, or the resource allocation information is configured by the base station, and notified by the base station to a terminal; and when the resource allocation information is determined in accordance with the predefined rule, a same predefined rule is used by the base station and the terminal

11

(56) References Cited

U.S. PATENT DOCUMENTS

| | | | |
|---|---|---|---|
| 2020/0252978 A1* | 8/2020 | Yi | H04W 74/0833 |
| 2021/0058947 A1* | 2/2021 | Lin | H04W 74/0833 |

FOREIGN PATENT DOCUMENTS

| | | | | |
|---|---|---|---|---|
| EP | 3826408 A1 * | 5/2021 | | H04L 5/0098 |
| WO | WO-2017/131459 A1 | 8/2017 | | |
| WO | WO-2017/135345 A1 | 8/2017 | | |
| WO | WO-2018/030711 A1 | 2/2018 | | |
| WO | WO-2019083278 A1 * | 5/2019 | | H04L 5/0044 |

OTHER PUBLICATIONS

3GPP 38.321, V15.2.0, 5G; NR; Medium Access Control (MAC) protocol specification, Jun. 2018 (Year: 2018).*

Notice of Reasons for Refusal dated Feb. 15, 2022 in Japanese Application No. 2021-500999.

ZTE Co., "RACH Configuration and BWPs," 3GPP TSG-RAN WG2 Meeting #102, R2-1808322, 3GPP, Jan. 15, 2005.

Qualcomm Incorporated, "BWPs for random access in connected mode, "3GPP TSG RAN WG2 Meeting RAN2#100 R2-1713806, Nov. 17, 2016.

European Office Action dated May 20, 2022 for Application No. 19 834 031.7.

Huawei, Hisilicon, "Further considerations on RA and BWP", 3GPP TSG-RAN2 NR Ad hoc 0118, R2-1800187, Jan. 22-26, 2018, Vancouver, Canace.

ETSI MCC, "Report of 3GPP TSG RAN2#101 meeting, Athens, Greece", 3GPP TSG-RAN WG2 meeting #101, R2-1804xxx, Apr. 16-20, 2018, Sanya, China.

Japanese Office Action dated Jun. 1, 2022 for Japanese Patent Application No. 2021-500999.

Nokia, Nokia Shanghai Bell, "BWP during initial access", Agenda item 10.4.1.3.3, 3GPP TSG-RAN WG2 Meeting NR Adhoc 1807, R2-1810032, Jul. 2-6, 2018, Montreal, Canada.

ISR-Written-Opinion dated Jan. 19, 2021 for International Application No. PCT/CN2019/094503.

LG Electronics Inc., "Remaining issue on the BWP linkage", 3GPP TSG-RAN WG2 Meeting #101bis, R2-1804872, Apr. 16-20, 2018, Sanya, China.

LG Electronics Inc., "Issues on CBRA in BWP operation", 3GPP TSSG-RAN WG2 Meeting #101, R2-1802441, Feb. 26-Mar. 2, 2018, Athens, Greece.

* cited by examiner determining resource allocation information of an msg3 in a CBRA process, wherein the resource allocation information is determined by a base station in accordance with a predefined rule, or the resource allocation information is configured by the base station, and notified by the base station to a terminal; and when the resource allocation information is determined in accordance with the predefined rule, a same predefined rule is used by the base station and the terminal ⎯ 11

Fig.1 determining resource allocation information of an msg3 in a CBRA process, wherein the resource allocation information is determined by a terminal in accordance with a predefined rule, or the resource allocation information is configured and notified by a base station; and when the resource allocation information is determined in accordance with the predefined rule, a same predefined rule is used by the base station and the terminal ⎯ 21

Fig.2

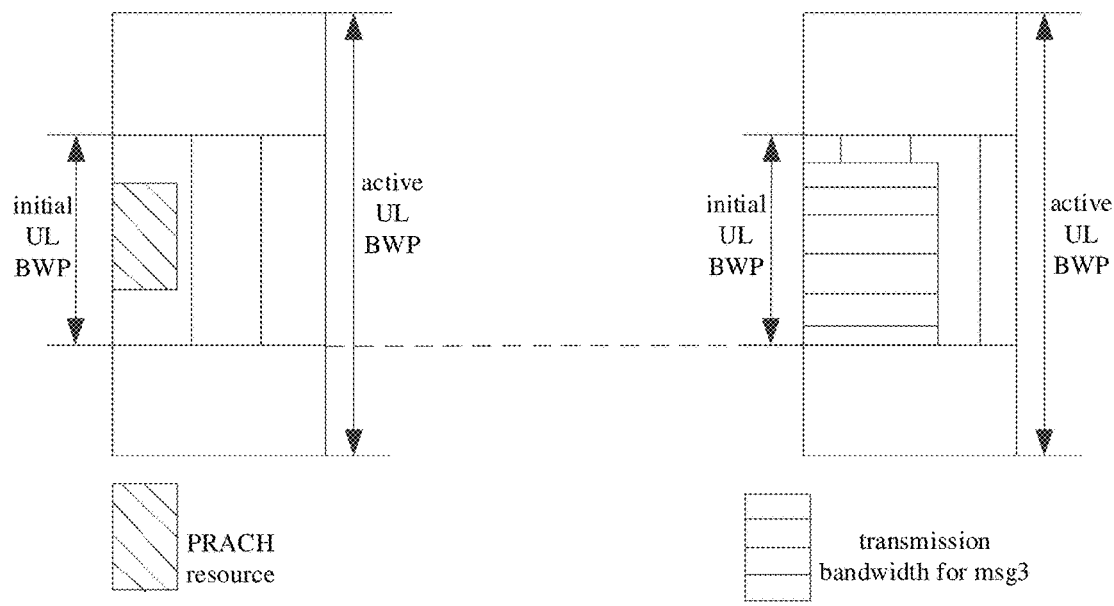

Fig.3

UPLINK RESOURCE ALLOCATION METHOD AND DEVICE, BASE STATION, AND TERMINAL

CROSS-REFERENCE TO RELATED APPLICATIONS

The present application is the U.S. national phase of PCT Application No. PCT/CN2019/094503 filed on Jul. 3, 2019, which claims a priority of the Chinese patent application No. 201810770374.X filed in China on Jul. 13, 2018, which is incorporated herein by reference in its entirety.

TECHNICAL FIELD

The present disclosure relates to the field of communication technology, in particular to an uplink resource allocation method, an uplink resource allocation device, a base station and a terminal.

BACKGROUND

In a Long Term Evolution (LTE) system, a terminal and a base station understand a system bandwidth in a same manner. When a preamble is transmitted by the terminal on a Physical Random Access Channel (PRACH) resource configured by the base station and the base station has received the preamble, the transmission of an msg3 (message 3) may be scheduled on the bandwidth in accordance with the system bandwidth understood in a same manner. Contents of an Uplink (UL) grant for the msg3 carried in a Random Access Response (RAR) are shown as follows: hopping flag (1 bit), fixed size resource block allocation (10 bits), truncated modulation and coding scheme (4 bits), Transmit Power Control (TPC) command for scheduled Physical Uplink Shared Channel (PUSCH) (3 bits), UL delay (1 bit), and Channel State Information (CSI) request (1 bit).

The base station indicates the resource allocation for the msg3 using a fixed size resource block allocation indication field in accordance with a current transmission system bandwidth, and the terminal determines how to transmit the msg3 within the transmission system bandwidth in accordance with the indication field.

In other words, in the LTE system in the related art, the configuration of the PRACH resource and the transmission of the msg3 are both based on the current transmission system bandwidth, and the terminal and the base station understand the transmission system bandwidth in a same manner. In a $5^{th}$-Generation (5G) system, the base station may configure different UL Bandwidth Parts (UL BWPs) for different terminals. When the terminal initiates a Contention-Based Random Access (CBRA) process on an active UL BWP, there is no definite scheme in the related art about the UL BWP based on which the base station allocates the resource for the msg3, and how the terminal understand a resource allocation field upon the receipt of the UL grant from the base station.

To be specific, in a 5G mobile communication system, the allocation of the resource for the msg3 in the CBRA process is indicated by the UL grant carried in the RAR, and the quantity of bits of a frequency-domain resource allocation indication field in the UL grant is constant. When the terminal enters a linked state, the base station may configure different BWPs for different terminals. When a same preamble is transmitted by a plurality of terminals on a same Random Access Channel (RACH) resource, it is impossible for the base station to differentiate BWP configurations for different terminals, so the terminal and the base station may understand the UL BWP for the terminal in a different manner, and errors may probably occur during the transmission and reception of the msg3. There is no definite scheme in the related art about how to solve this problem.

SUMMARY

An object of the present disclosure is to provide an uplink resource allocation method, an uplink resource allocation device, a base station and a terminal, so as to prevent the occurrence of errors during the transmission and reception of the msg3 due to a resource allocation scheme of the msg3 in the CBRA process in the related art.

In order to solve the above technical problem, the present disclosure provides in some embodiments an uplink resource allocation method, including determining resource allocation information of an msg3 in a CBRA process. The resource allocation information is determined by a base station in accordance with a predefined rule; or the resource allocation information is configured by the base station, and notified by the base station to a terminal. When the resource allocation information is determined in accordance with the predefined rule, a same predefined rule is used by the base station and the terminal.

Optionally, the determining the resource allocation information of the msg3 in the CBRA process includes: determining a transmission BWP for the msg3 in accordance with an initial UL BWP, and an active UL BWP configured for the terminal includes an entirety of the initial UL BWP.

Optionally, the determining the resource allocation information of the msg3 in the CBRA process includes: determining a frequency-domain range or a BWP for scheduling and transmitting the msg3 in accordance with configurations of the initial UL BWP and an active BWP and a configuration of a PRACH resource.

Optionally, the determining the frequency-domain range or the BWP for scheduling and transmitting the msg3 in accordance with the configurations of the initial UL BWP and the active BWP and the configuration of the PRACH resource includes, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, scheduling the msg3 in accordance with the initial UL BWP.

Optionally, the active UL BWP configured for the terminal includes an entirety of the initial UL BWP.

Optionally, the active UL BWP configured for the terminal including the entirety of the initial UL BWP is the active UL BWP configured for all the terminals that have the completely coincided PRACH resources and belong to the same preamble group, wherein the active UL BWP includes the entirety of the initial UL BWP.

Optionally, the determining the frequency-domain range or the BWP for scheduling and transmitting the msg3 in accordance with the configurations of the initial UL BWP and the active BWP and the configuration of the PRACH resource further includes, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, scheduling the msg3 in accordance with a preset BWP. The preset BWP has a same size as the initial UL BWP and starts from a lowest Physical Resource Block (PRB) index of the active UL BWP; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by Radio Resource Control (RRC) signaling; or the preset BWP is an UL BWP indicated by the RRC signaling, the UL BWP is used for scheduling the msg3 by the base station and transmitting the msg3 by the terminal; wherein the BWP is completely included in the active UL BWP.

Optionally, the active UL BWP configured for the terminal does not include an entirety of the initial UL BWP.

Optionally, the determining the resource allocation information of the msg3 in the CBRA process includes: notifying the terminal of the frequency-domain range or the BWP for scheduling and transmitting the msg3 through the RRC signaling.

Optionally, the uplink resource allocation method further includes configuring for the terminal the PRACH resource, and configuring for the terminal the corresponding frequency-domain range or BWP for transmitting the msg3.

Optionally, the frequency-domain range or the BWP is included in the active UL BWP for the terminal.

Optionally, for the same PRACH resource configured for different terminals, the frequency-domain range or the BWP is located at a same position in a carrier.

Optionally, the determining the resource allocation information of the msg3 in the CBRA process includes scheduling the msg3 in accordance with a preset frequency-domain range or BWP when scheduling the msg3. A size of the preset frequency-domain range or BWP is notified through explicit signaling or predefined in a protocol; and/or a start Resource Block (RB) index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to perform corresponding acknowledgement in an RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The present disclosure further provides in some embodiments an uplink resource allocation method, including determining resource allocation information of an msg3 in a CBRA process. The resource allocation information is determined by a terminal in accordance with a predefined rule, or the resource allocation information is configured and notified by a base station. When the resource allocation information is determined in accordance with the predefined rule, a same predefined rule is used by the base station and the terminal.

Optionally, the determining the resource allocation information of the msg3 in the CBRA process includes transmitting the msg3 in accordance with UL grant information carried in an RAR within an initial UL BWP.

Optionally, the determining the resource allocation information of the msg3 in the CBRA process includes determining a frequency-domain range or a BWP for scheduling and transmitting the msg3 in accordance with configurations of the initial UL BWP and an active BWP and a configuration of a PRACH resource.

Optionally, the determining the frequency-domain range or the BWP for scheduling and transmitting the msg3 in accordance with the configurations of the initial UL BWP and the active BWP and the configuration of the PRACH resource includes, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmitting the corresponding msg3 within an initial BWP in accordance with the UL grant information transmitted by the base station.

Optionally, the active UL BWP includes an entirety of the initial UL BWP.

Optionally, the determining the frequency-domain range or the BWP for scheduling and transmitting the msg3 in accordance with the configurations of the initial UL BWP and the active BWP and the configuration of the PRACH resource further includes, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmitting the msg3 on a preset BWP in accordance with the UL grant information transmitted by the base station. The preset BWP has a same size as the initial UL BWP and starts from a lowest PRB index of the active UL BW; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by RRC signaling, or the preset BWP is an UL BWP indicated by the RRC signaling for scheduling the msg3 by the base station and transmitting the msg3 by the terminal, and the BWP is completely included in the active UL BWP.

Optionally, the active UL BWP configured by the base station for the terminal does not include an entirety of the initial UL BWP.

Optionally, the determining the resource allocation information of the msg3 in the CBRA process includes determining the frequency-domain range or the BWP for scheduling and transmitting the msg3 through the RRC signaling.

Optionally, the frequency-domain range or the BWP for transmitting the msg3 is configured correspondingly by the base station when the PRACH resource is configured by the base station for the terminal.

Optionally, the frequency-domain range or the BWP is included in the active UL BWP for the terminal.

Optionally, the determining the resource allocation information of the msg3 in the CBRA process includes transmitting the msg3 in accordance with scheduling of the base station within a preset frequency-domain range or BWP. A size of the preset frequency-domain range or BWP is notified through explicit signaling or predefined in a protocol; or a start RB index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to respond accordingly in the RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The present disclosure further provides in some embodiments a base station, including a memory, a processor, a transceiver, and a computer program stored in the memory and executed by the processor. The processor is configured to execute the computer program so as to determine resource allocation information of an msg3 in a CBRA process. The resource allocation information is determined by the base station in accordance with a predefined rule, or configured by the base station and notified by the base station through the transceiver to a terminal. When the resource allocation information is determined in accordance with the predefined rule, a same predefined rule is used by the base station and the terminal.

Optionally, the processor is further configured to determine a transmission BWP for the msg3 in accordance with an initial UL BWP, and an active UL BWP configured for the terminal includes an entirety of the initial UL BWP.

Optionally, the processor is further configured to determine a frequency-domain range or a BWP for scheduling and transmitting the msg3 in accordance with configurations of the initial UL BWP and an active BWP and a configuration of a PRACH resource.

Optionally, the processor is further configured to, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, schedule the msg3 in accordance with the initial UL BWP.

Optionally, the active UL BWP configured for the terminal includes an entirety of the initial UL BWP.

Optionally, the active UL BWP configured for the terminal including the entirety of the initial UL BWP is: the active UL BWP configured for all the terminals that have the completely coincided PRACH resources and belong to the same preamble group, wherein the active UL BWP includes the entirety of the initial UL BWP Optionally, the processor is further configured to, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, schedule the msg3 in accordance with a preset BWP. The preset BWP has a same size as the initial UL BWP and starts from a lowest PRB index of the active UL BWP; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by RRC signaling, or the preset BWP is an UL BWP indicated by the RRC signaling for scheduling the msg3 by the base station and transmitting the msg3 by the terminal, and the BWP is completely included in the active UL BWP.

Optionally, the active UL BWP configured for the terminal does not include an entirety of the initial UL BWP.

Optionally, the processor is further configured to notify the terminal of the frequency-domain range or the BWP for scheduling and transmitting the msg3 through the RRC signaling.

Optionally, the processor is further configured to configure for the terminal the PRACH resource, and configure for the terminal the corresponding frequency-domain range or BWP for transmitting the msg3.

Optionally, the frequency-domain range or the BWP is included in the active UL BWP for the terminal.

Optionally, for the same PRACH resource configured for different terminals, the frequency-domain range or the BWP is located at a same position in a carrier.

Optionally, the processor is further configured to schedule the msg3 in accordance with a preset frequency-domain range or BWP. A size of the preset frequency-domain range or BWP is notified through explicit signaling or predefined in a protocol; or a start RB index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to perform corresponding acknowledgement in an RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The present disclosure further provides in some embodiments a terminal, including a memory, a processor, a transceiver, and a computer program stored in the memory and executed by the processor. The processor is configured to execute the computer program so as to determine resource allocation information of an msg3 in a CBRA process. The resource allocation information is determined by the terminal in accordance with a predefined rule, or configured and notified by a base station. When the resource allocation information is determined in accordance with the predefined rule, a same predefined rule is used by the base station and the terminal.

Optionally, the processor is further configured to transmit through the transceiver the msg3 in accordance with UL grant information carried in an RAR within an initial UL BWP.

Optionally, the processor is further configured to determine a frequency-domain range or a BWP for scheduling and transmitting the msg3 in accordance with configurations of the initial UL BWP and an active BWP and a configuration of a PRACH resource.

Optionally, the processor is further configured to, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmit the msg3 within an initial BWP in accordance with the UL grant information transmitted by the base station.

Optionally, the active UL BWP includes an entirety of the initial UL BWP.

Optionally, the processor is further configured to, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmit the msg3 on a preset BWP in accordance with the UL grant information transmitted by the base station. The preset BWP has a same size as the initial UL BWP and starts from a lowest PRB index of the active UL BWP; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by RRC signaling, or the preset BWP is an UL BWP indicated by the RRC signaling for scheduling the msg3 by the base station and transmitting the msg3 by the terminal, and the BWP is completely included in the active UL BWP.

Optionally, the active UL BWP configured by the base station for the terminal does not include an entirety of the initial UL BWP.

Optionally, the processor is further configured to determine the frequency-domain range or the BWP for scheduling and transmitting the msg3 through the RRC signaling.

Optionally, the frequency-domain range or the BWP for transmitting the msg3 is configured correspondingly by the base station when the PRACH resource is configured by the base station for the terminal.

Optionally, the frequency-domain range or the BWP is included in the active UL BWP for the terminal.

Optionally, the processor is further configured to transmit through the transceiver the msg3 in accordance with scheduling of the base station within a preset frequency-domain range or BWP. A size of the preset frequency-domain range or BWP is notified through explicit signaling or predefined in a protocol; or a start RB index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to respond accordingly in the RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The present disclosure further provides in some embodiments a computer-readable storage medium storing therein a computer program. The computer program is executed by a processor so as to implement the steps of the above-mentioned uplink resource allocation method.

In still yet another aspect, the present disclosure provides in some embodiments an uplink resource allocation device, including a first determination module configured to determine resource allocation information of an msg3 in a CBRA process. The resource allocation information is determined by a base station in accordance with a predefined rule, or the resource allocation information is configured by the base station, and notified by the base station to a terminal. When the resource allocation information is determined in accordance with the predefined rule, a same predefined rule is used by the base station and the terminal.

Optionally, the first determination module includes a first processing sub-module configured to determine a transmission BWP for the msg3 in accordance with an initial UL BWP, and an active UL BWP configured for the terminal includes an entirety of the initial UL BWP.

Optionally, the first determination module includes a first determination sub-module configured to determine a frequency-domain range or a BWP for scheduling and transmitting the msg3 in accordance with configurations of the initial UL BWP and an active BWP and a configuration of a PRACH resource.

Optionally, the first determination sub-module includes a first processing unit configured to, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, schedule the msg3 in accordance with the initial UL BWP.

Optionally, the active UL BWP configured for the terminal includes an entirety of the initial UL BWP.

Optionally, the active UL BWP configured for the terminal including the entirety of the initial UL BWP is the active UL BWP configured for all the terminals that have the completely coincided PRACH resources and belong to the same preamble group, wherein the active UL BWP includes the entirety of the initial UL BWP.

Optionally, the first determination sub-module further includes a second processing unit configured to, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, schedule the msg3 in accordance with a preset BWP. The preset BWP has a same size as the initial UL BWP and starts from a lowest PRB index of the active UL BWP; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by RRC signaling, or the preset BWP is an UL BWP indicated by the RRC signaling for scheduling the msg3 by the base station and transmitting the msg3 by the terminal, and the BWP is completely included in the active UL BWP.

Optionally, the active UL BWP configured for the terminal does not include an entirety of the initial UL BWP.

Optionally, the first determination module includes a second processing sub-module configured to notify the terminal of the frequency-domain range or the BWP for scheduling and transmitting the msg3 through the RRC signaling.

Optionally, the uplink resource allocation device further includes a first processing module configured to configure for the terminal the PRACH resource, and configure for the terminal the corresponding frequency-domain range or BWP for transmitting the msg3.

Optionally, the frequency-domain range or the BWP is included in the active UL BWP for the terminal.

Optionally, for the same PRACH resource configured for different terminals, the frequency-domain range or the BWP is located at a same position in a carrier.

Optionally, the first determination module includes a third processing sub-module configured to schedule the msg3 in accordance with a preset frequency-domain range or BWP. A size of the preset frequency-domain range or BWP is notified through explicit signaling or predefined in a protocol; and/or a start RB index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to perform corresponding acknowledgement in an RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The present disclosure further provides in some embodiments an uplink resource allocation device, including a second determination module configured to determine resource allocation information of an msg3 in a CBRA process. The resource allocation information is determined by a terminal in accordance with a predefined rule, or the resource allocation information is configured and notified by a base station. When the resource allocation information is determined in accordance with the predefined rule, a same predefined rule is used by the base station and the terminal.

Optionally, the second determination module includes a fourth processing sub-module configured to transmit the msg3 in accordance with UL grant information carried in an RAR within an initial UL BWP.

Optionally, the second determination module includes a second determination sub-module configured to determine a frequency-domain range or a BWP for scheduling and transmitting the msg3 in accordance with configurations of the initial UL BWP and an active BWP and a configuration of a PRACH resource.

Optionally, the second determination sub-module includes a third processing unit configured to, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmit the msg3 within an initial BWP in accordance with the UL grant information transmitted by the base station.

Optionally, the active UL BWP includes an entirety of the initial UL BWP.

Optionally, the second determination sub-module further includes a fourth processing unit configured to, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmit the msg3 on a preset BWP in accordance with the UL grant information transmitted by the base station. The preset BWP has a same size as the initial UL BWP and starts from a lowest PRB index of the active UL BWP; or the preset BWP is the active UL BWP; or the preset BWP has a same size as the initial UL BWP and starts from a lowest PRB index of the PRACH resource on which the preamble is transmitted by the terminal; or the preset BWP has a same size as the initial UL BWP, and a start point of the preset BWP is a determined PRB index indicated by RRC signaling, or the preset BWP is an UL BWP indicated by the RRC signaling for scheduling the msg3 by the base station and transmitting the msg3 by the terminal, and the BWP is completely included in the active UL BWP.

Optionally, the active UL BWP configured by the base station for the terminal does not include an entirety of the initial UL BWP.

Optionally, the second determination module includes a fifth processing sub-module configured to determine the frequency-domain range or the BWP for scheduling and transmitting the msg3 through the RRC signaling.

Optionally, the frequency-domain range or the BWP for transmitting the msg3 is configured correspondingly by the base station when the PRACH resource is configured by the base station for the terminal.

Optionally, the frequency-domain range or the BWP is included in the active UL BWP for the terminal.

Optionally, the second determination module includes a sixth processing sub-module configured to transmit the msg3 in accordance with scheduling from the base station within a preset frequency-domain range or BWP. A size of the preset frequency-domain range or BWP is notified through explicit signaling or predefined in a protocol; and/or a start RB index of the preset frequency-domain range or BWP is the same as a lowest RB number of the PRACH resource for transmitting the corresponding preamble. The preset frequency-domain range or BWP is completely located in the active UL BWP for the terminal.

Optionally, when the start RB index of the preset frequency-domain range or BWP is the same as the lowest RB number of the PRACH resource for transmitting the corresponding preamble, the preamble is a preamble that is successfully received by the base station and notifies the base station to respond accordingly in the RAR.

Optionally, when the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

In the above solutions, according to the uplink resource assignment method in the embodiments of the present disclosure, the resource allocation information of the msg3 in the CBRA process may be determined. The resource allocation information may be determined by the base station in accordance with the predefined rule, or the resource allocation information is configured by the base station, and notified by the base station to the terminal. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

BRIEF DESCRIPTION OF THE DRAWINGS

FIG. 1 is a flow chart of an uplink resource allocation method according to an embodiment of the present disclosure;

FIG. 2 is another flow chart of an uplink resource allocation method according to an embodiment of the present disclosure;

FIG. 3 is a schematic view showing allocated uplink resources according to an embodiment of the present disclosure;

DETAILED DESCRIPTION

Figure 4:
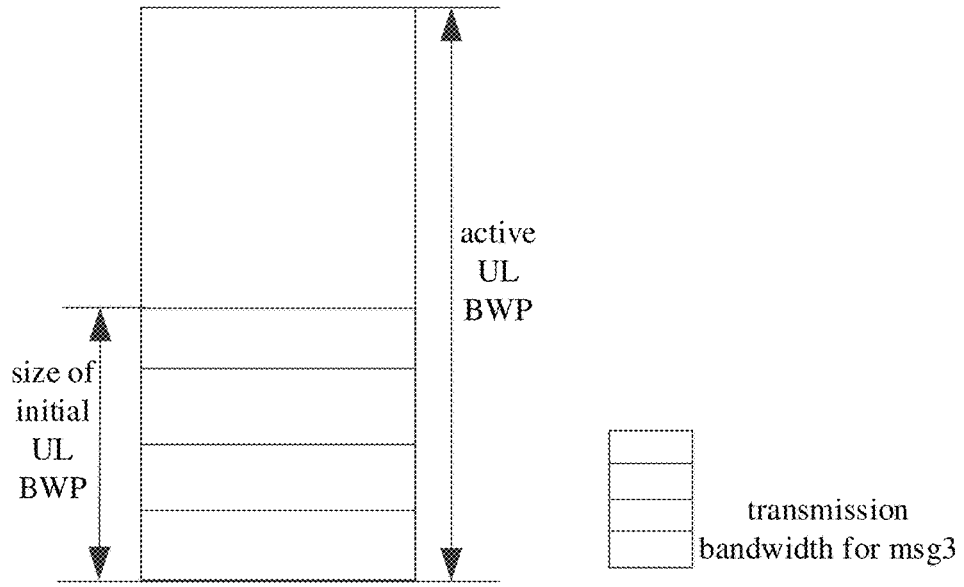
FIG. 4 is another schematic view showing allocated uplink resources according to an embodiment of the present disclosure.

In order to make the objects, the technical solutions and the advantages of the present disclosure more apparent, the present disclosure will be described hereinafter in details in conjunction with the drawings and embodiments.

In order to solve the problem in the related art where errors occur during the transmission and reception of an msg3 due to a resource allocation scheme for the msg3 in a CBRA process, the present disclosure provides in some embodiments an uplink resource allocation method (for a base station) which, as shown in FIG. 1, includes Step 11 of determining resource allocation information of an msg3 in a CBRA process, wherein the resource allocation information is determined by a base station in accordance with a predefined rule, or the resource allocation information is configured by the base station, and notified by the base station to a terminal; and when the resource allocation information is determined in accordance with the predefined rule, a same predefined rule is used by the base station and the terminal.

According to the uplink resource allocation method in the embodiments of the present disclosure, the resource allocation information of the msg3 in the CBRA process may be determined. The resource allocation information may be determined by the terminal in accordance with the predefined rule, or the resource allocation information is configured by the base station, and notified by the base station to the terminal. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

In the embodiments of the present disclosure, Step 11 will be described hereinafter in conjunction with, but not limited to, the following four examples.

In a first example, the determining the resource allocation information of the msg3 in the CBRA process may include determining a transmission BWP for the msg3 in accordance with an initial UL BWP, and an active UL BWP configured for the terminal may include an entirety of the initial UL BWP.

In a second example, the determining the resource allocation information of the msg3 in the CBRA process may include determining a frequency-domain range or a BWP for scheduling and transmitting the msg3 in accordance with configurations of the initial UL BWP and an active BWP and a configuration of a PRACH resource.

The determining the frequency-domain range or the BWP for scheduling and transmitting the msg3 in accordance with the configurations of the initial UL BWP and the active BWP and the configuration of the PRACH resource may include, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, scheduling the msg3 in accordance with the initial UL BWP. To be specific, the active UL BWP configured for the terminal may include an entirety of the initial UL BWP.

More specifically, the active UL BWP configured for the terminal including the entirety of the initial UL BWP is the active UL BWP configured for all the terminals that have the completely coincided PRACH resources and belong to the same preamble group, wherein the active UL BWP includes the entirety of the initial UL BWP.

Further, the determining the frequency-domain range or the BWP for scheduling and transmitting the msg3 in accordance with the configurations of the initial UL BWP and the active BWP and the configuration of the PRACH resource may further include, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, scheduling the msg3 in accordance with a preset BWP. The preset BWP may have a same size as the initial UL BWP and start from a lowest PRB index of the active UL BWP; or the preset BWP may be the active UL BWP; or the preset BWP may have a same size as the initial UL BWP and start from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured for the terminal may not include an entirety of the initial UL BWP.

In a third example, the determining the resource allocation information of the msg3 in the CBRA process may include notifying the terminal of the frequency-domain range or the BWP for scheduling and transmitting the msg3 through the RRC signaling.

In addition, the uplink resource allocation method may further include configuring for the terminal the PRACH resource, and configuring for the terminal the corresponding frequency-domain range or BWP for transmitting the msg3.

The frequency-domain range or the BWP may be included in the active UL BWP for the terminal.

To be specific, for the same PRACH resource configured for different terminals, the frequency-domain range or the BWP may be located at a same position in a carrier.

In a fourth example, the determining the resource allocation information of the msg3 in the CBRA process may include scheduling the msg3 in accordance with a preset frequency-domain range or BWP. A size of the preset frequency-domain range or BWP may be notified through explicit signaling or predefined in a protocol; and/or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble may be a preamble successfully received by the base station and indicating the base station to perform corresponding acknowledgement in an RAR.

When the size of the preset frequency-domain range or BWP is notified through the explicit signaling or predefined in a protocol, the size of the preset frequency-domain range or BWP may be notified through RRC signaling, or the size of the preset frequency-domain range or BWP may be the same as the initial UL BWP, or the size of the preset frequency-domain range or BWP may be another preset value.

The present disclosure further provides in some embodiments an uplink resource allocation method (for a terminal) which, as shown in FIG. 2, includes Step 21 of determining resource allocation information of an msg3 in a CBRA process, wherein the resource allocation information is determined by a terminal in accordance with a predefined rule, or the resource allocation information is configured and notified by a base station; and when the resource allocation information is determined in accordance with the predefined rule, a same predefined rule is used by the base station and the terminal.

According to the uplink resource allocation method in the embodiments of the present disclosure, the resource allocation information of the msg3 in the CBRA process may be determined. The resource allocation information may be determined by the terminal in accordance with the predefined rule, or the resource allocation information is configured by the base station, and notified by the base station to the terminal. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

In the embodiments of the present disclosure, Step 21 will be described hereinafter in conjunction with, but not limited to, the following four examples (corresponding to the above four examples with respect to the Step 11).

In a first example, the determining the resource allocation information of the msg3 in the CBRA process may include transmitting the msg3 in accordance with UL grant information carried in an RAR within an initial UL BWP.

In a second example, the determining the resource allocation information of the msg3 in the CBRA process may include determining a frequency-domain range or a BWP for scheduling and transmitting the msg3 in accordance with configurations of the initial UL BWP and an active BWP and a configuration of a PRACH resource.

The determining the frequency-domain range or the BWP for scheduling and transmitting the msg3 in accordance with the configurations of the initial UL BWP and the active BWP and the configuration of the PRACH resource may include, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmitting the corresponding msg3 within an initial BWP in accordance with the UL grant information transmitted by the base station. To be specific, the active UL BWP may include an entirety of the initial UL BWP.

Further, the determining the frequency-domain range or the BWP for scheduling and transmitting the msg3 in accordance with the configurations of the initial UL BWP and the active BWP and the configuration of the PRACH resource may further include, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmitting the msg3 on a preset BWP in accordance with the UL grant information transmitted by the base station. The preset BWP may be a BWP that has a same size as the initial UL BWP and starts from a lowest PRB index of the active UL BWP; or the preset BWP may be the active UL BWP; or the preset BWP may have a same size as the initial UL BWP and start from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured by the base station for the terminal may not include an entirety of the initial UL BWP.

In a third example, the determining the resource allocation information of the msg3 in the CBRA process may include determining the frequency-domain range or the BWP for scheduling and transmitting the msg3 through the RRC signaling.

The frequency-domain range or the BWP for transmitting the msg3 may be configured correspondingly by the base station when the PRACH resource is configured by the base station for the terminal.

To be specific, the frequency-domain range or the BWP may be included in the active UL BWP for the terminal.

In a fourth example, the determining the resource allocation information of the msg3 in the CBRA process may include transmitting the msg3 in accordance with scheduling of the base station within a preset frequency-domain range or BWP. A size of the preset frequency-domain range or BWP may be notified through explicit signaling or predefined in a protocol; or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble may be a preamble successfully received by the base station and indicating the base station to perform corresponding acknowledgement in the RAR.

When the size of the preset frequency-domain range or BWP is notified through the explicit signaling or predefined in a protocol, the size of the preset frequency-domain range or BWP may be notified through RRC signaling, or the size of the preset frequency-domain range or BWP may be the same as the initial UL BWP, or the size of the preset frequency-domain range or BWP may be another preset value.

The uplink resource allocation method will be further described hereinafter in conjunction with the base station and the terminal.

With respect to the above technical problems, the present disclosure provides in some embodiments an uplink resource allocation method, so as to ensure the terminal and the base station to understand the resource allocation for the msg3 in the CBRA process in a same manner mainly through explicit signaling or a mode predefined in a protocol. The present disclosure provides, but not limited to, the following four implementation methods.

In a first method, the base station may always determine the transmission BWP for the msg3 in accordance with the initial UL BWP, and the terminal may detect and receive the msg3 within the initial UL BWP in accordance with the UL grant carried in the RAR.

The base station needs to ensure that the active UL BWP of the terminal always includes a configuration configured by the base station for the terminal (i.e., the initial UL BWP).

In a second method, the base station and the terminal may determine the frequency-domain range or BWP for scheduling and transmitting the msg3 in accordance with configurations of the initial UL BWP and the active BWP and a configuration of the PRACH resource (it is merely necessary for the terminal to know its own configurations).

(1) When the configurations meet the following conditions, the base station may schedule the msg3 in accordance with the initial UL BWP, and the terminal may transmit the corresponding msg3 within the initial BWP in accordance with the UL grant from the base station: condition 1 where the PRACH resources configured by the base station for the terminal within the active UL BWP (including time-domain resources, frequency-domain resources, preamble resources, etc.) completely coincide with the PRACH resources configured for the terminal within the initial UL BWP, and condition 2 where the preamble is transmitted by the terminal on the PRACH resource and the preamble belongs to a preamble group configured on the initial UL BWP.

Optionally, the active UL BWP configured by the base station for the terminal may completely include the initial UL BWP.

To be specific, during the configuration, the base station may ensure that the active UL BWP configured for all the terminals, having the completely coincided PRACH resources and having the same preamble group includes an entirety of the initial UL BWP.

(2) Otherwise (when the configurations fail to meet at least one of the above conditions, or when the configurations fail to meet at least one of the above conditions and the active UL BWP configured by the base station for the terminal does not include an entirety of the initial UL BWP), the base station may schedule the msg3 in accordance with a specific BWP size and a BWP position, and the terminal may transmit the msg3 at the specific BWP size and BWP position in accordance with the UL grant from the base station.

The base station and the terminal may understand the specific BWP size and the BWP position in a same manner. The specific BWP may be a BWP that has a same size as the initial UL BWP and starts from a lowest PRB index of the active UL BWP; or the specific BWP may be the active UL BWP; or the specific BWP may have a same size as the initial UL BWP and start from a lowest PRB index of the PRACH resource on which the preamble is transmitted by the terminal; or the specific BWP may has a same size as the initial UL BWP with a determined PRB index indicated by RRC signaling as a start point of the specific BWP, or the specific BWP may be an UL BWP indicated by the RRC signaling for scheduling the msg3 by the base station and transmitting the msg3 by the terminal, and the BWP may be completely included in the active UL BWP.

In a third method, the frequency-domain range or BWP for scheduling and transmitting the msg3 may be notified through the RRC signaling (the base station may notify the terminal of the resources in advance through additional signaling, i.e., the RRC signaling, and then schedule the msg3 using the notified resource, and the terminal may transmit the msg3 using the notified resource.

To be specific, the base station may configure the PRACH resource and the corresponding frequency-domain range or msg3-BWP for transmitting the msg3 for the terminal. The frequency-domain range or msg3-BWP may be included in the active UL BWP for the terminal. For the same PRACH resource (including a time-domain resource, a frequency-domain resource, a preamble group, etc.) configured for different terminals, the frequency-domain range or msg3-BWP may be located at a same position in a carrier.

Upon the receipt of the preamble from the terminal, the base station may schedule the msg3 within the frequency-domain range or msg3-BWP for transmitting the msg3 in accordance with the above configuration. Upon the receipt of the UL grant carried in the RAR from the base station, the terminal may transmit the msg3 within the configured frequency-domain range or msg3-BWP in accordance with the scheduling information.

In a fourth method, the base station may schedule the msg3 in accordance with a specific frequency-domain range or BWP, and the terminal may transmit the msg3 within the specific frequency-domain range or BWP in accordance with the UL grant from the base station.

(1) A size of the specific frequency-domain range or BWP may be notified through explicit signaling or predefined in a protocol; or the size of the specific frequency-domain range or BWP may be notified through the RRC signaling; or the size of the specific frequency-domain range or BWP may be the same as the initial UL BWP; or the size of the specific frequency-domain range or BWP may be another preset value.

(2) A start RB index of the specific frequency-domain range or BWP may be the same as a lowest RB number of the PRACH resource for transmitting the corresponding preamble. The preamble may be a preamble successfully received by the base station and indicating that the base station needs to perform corresponding acknowledgement in the RAR.

In this method, the specific frequency-domain range or BWP may be completely located within the active UL BWP for the terminal.

The above four implementation methods will be illustratively described hereinafter.

Example 1 (Corresponding to the First Method)

The base station may always determine the transmission BWP for the msg3 in accordance with the initial UL BWP, and the terminal may detect and receive the msg3 within the initial UL BWP in accordance with the UL grant carried in the RAR. When configuring the active UL BWP for the terminal, the base station needs to ensure that each active UL BWP includes the initial UL BWP.

Presumed that four active UL BWPs, i.e., BWP1 to BWP4, have been configured by the base station for the terminal, the initial UL BWP may be completely included in the range of BWP1 to BWP4. Regardless of the active UL BWP where the terminal initiates a random access, the base station may allocate transmission resources for the msg3 within the initial UL BWP. Naturally, the BWP for transmitting the preamble will not be particularly defined herein, i.e., the preamble may be transmitted on a PRACH resource within a current active UL BWP configured by a gNB (base station).

Example 2 (Corresponding to the Second Method)

It is presumed that the terminal is in a connected state and the active UL BWP configured by the base station for the terminal is BWP1.

It is presumed that the active UL BWP configured by the base station completely includes the initial UL BWP, the PRACH resources configured by the base station within the active UL BWP completely coincide with the PRACH resources within the initial UL BWP, and the PRACH resources include frequency-domain resources, time-domain resources, code-domain resources, etc. At this time, after the base station has received the corresponding preamble on the PRACH resource, the UL grant about the msg3 may be carried in the RAR (to be specific, a resource for transmitting the msg3 may be indicated by the UL grant carried in the RAR). The scheduling information may be transmitted on the basis of the msg3 scheduled within the initial UL BWP. Upon the receipt of the scheduling information, the terminal may transmit the msg3 within the initial UL BWP. As shown in FIG. 3, the resource allocation may meet the following conditions: 1) the active UL BWP configured by the base station for the terminal completely includes the initial UL BWP; and 2) the PRACH resources configured by the base station for the terminal within the active UL BWP (including time-domain resources, frequency-domain resources, preamble resources, etc.) completely coincide with the PRACH resources configured within the initial UL BWP; and 3) the preamble is transmitted by the terminal on the PRACH resource and belongs to a preamble group configured on the initial UL BWP.

Otherwise (when the resource allocation fails to meet at least one of the above conditions, or when the resource allocation fails to meet at least one of the above conditions and the active UL BWP configured by the base station for the terminal does not include an entirety of the initial UL BWP), the base station may schedule the msg3 in accordance with a specific BWP size and a BWP position, and the terminal may transmit the msg3 at the specific BWP size and the BWP position in accordance with the UL grant from the base station.

It is presumed that the active UL BWP configured by the base station does not completely include the initial UL BWP (i.e., the active UL BWP configured by the base station for the terminal does not include an entirety of the initial UL BWP), the PRACH resources configured by the base station within the active UL BWP do not completely coincide with the PRACH resources configured within the initial UL BWP, and the PRACH resources include frequency-domain resources, time-domain resources, code-domain resources, etc. At this time, the base station may schedule the msg3 in accordance with the specific BWP size and BWP position, and the terminal may transmit the msg3 at the specific BWP size and BWP position in accordance with the UL grant from the base station. The specific BWP size and BWP position may be determined in different ways, e.g., (a) the specific BWP may be a BWP that has a same size as the initial UL BWP and starts from a lowest PRB index of the active UL BWP; or (b) the specific BWP may be the current active UL BWP; or (c) the specific BWP may have a same size as the initial UL BWP and start from a lowest PRB index of the PRACH resource on which the preamble is transmitted by the terminal; or (d) the specific BWP may has a same size as the initial UL BWP with a determined PRB index indicated by RRC signaling as a start point of the specific BWP, or the specific BWP may be an UL BWP indicated by the RRC signaling for scheduling the msg3 by the base station and transmitting the msg3 by the terminal, and the BWP may be completely included in the active UL BWP. When the RRC signaling is not configured by the base station, the base station and the terminal may allocate and understand the resources for the msg3 by default, e.g., in the above way (i.e., any of (a), (b) and (c) which are parallel to (d)).

To be specific, (a) the start position of the specific BWP or frequency-domain location for transmitting the msg3 may be the active UL BWP, and the specific BWP or frequency-domain location may have a same size as the initial UL BWP, as shown in FIG. 4.

Figure 5:
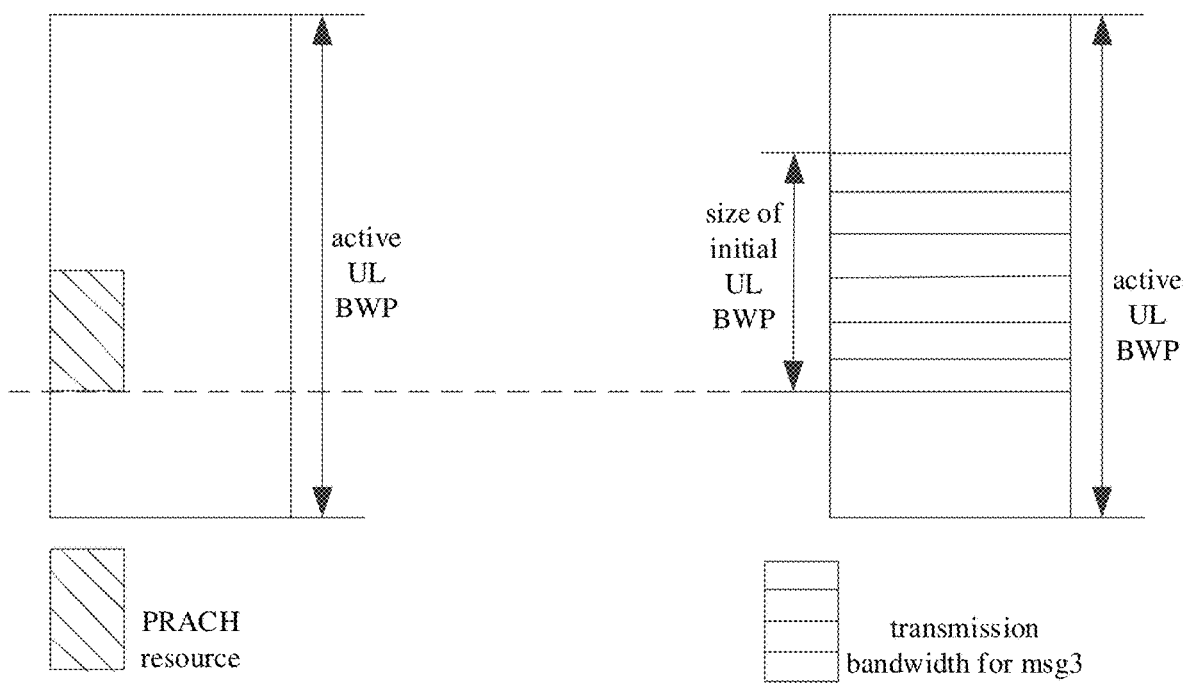
FIG. 5 is yet another schematic view showing allocated uplink resources according to an embodiment of the present disclosure.

(b) The start position of the specific BWP or frequency-domain location for transmitting the msg3 may be a start position of the PRACH resource, and may have a same size as the initial UL BWP, as shown in FIG. 5.

Figure 6:
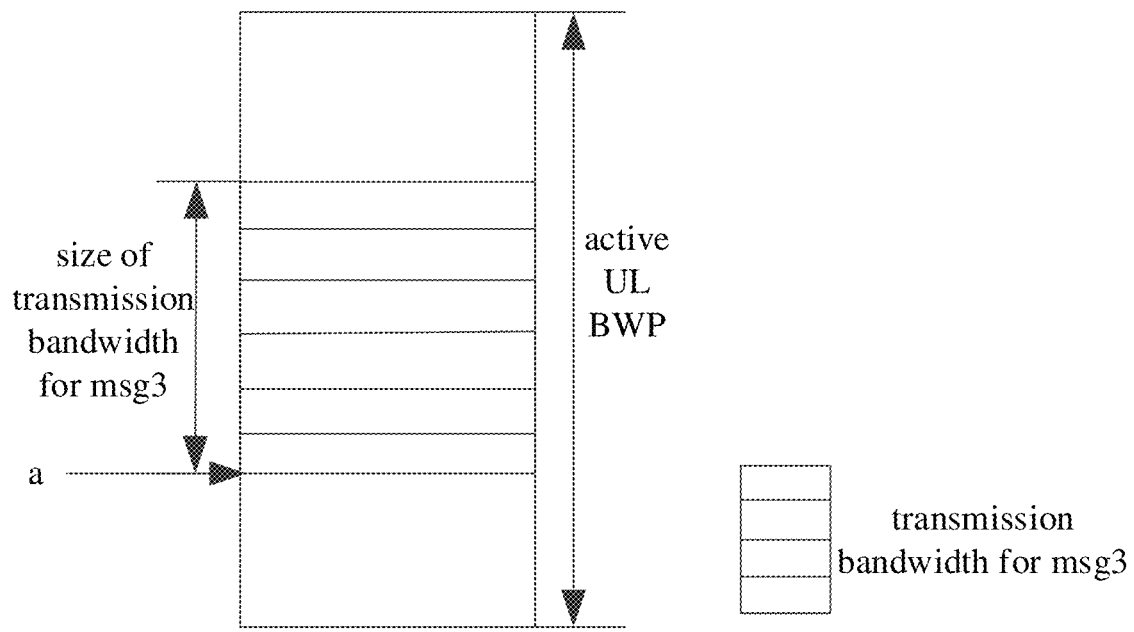
FIG. 6 is still yet another schematic view showing allocated uplink resources according to an embodiment of the present disclosure.

(c) The start position of the specific BWP or frequency-domain location for transmitting the msg3 and the size thereof may be notified through the RRC signaling, as shown in FIG. 6 (where "a" represents a start position of a transmission bandwidth for the msg3).

Naturally, the specific BWP or frequency-domain location for transmitting the msg3 may be determined in any combination of the above methods, which will not be particularly defined herein.

Example 3 (Corresponding to the Third Method)

It is presumed that the terminal is in the connected state, and the active UL BWP configured by the base station for the terminal is BWP1. The base station may notify the terminal of the position of the BWP or frequency-domain resource for transmitting the msg3 through the RRC signaling.

To be specific, the base station may configure the PRACH resource and the corresponding frequency-domain range or msg3-BWP for transmitting the message 3 for the terminal. The frequency-domain range or msg3-BWP may be included in the active UL BWP for the terminal. For the same PRACH resource configured for different terminals (including time-domain resource, frequency-domain resource, preamble group, etc.), the frequency-domain range or the msg3-BWP may be located at a same position in a carrier.

Upon the receipt of the preamble from the terminal, the base station may schedule the msg3 within the configured frequency-domain range or msg3-BWP for transmitting the msg3. Upon the receipt of the UL grant carried in the RAR from the base station, the terminal may transmit the msg3 within the configured frequency-domain range or msg3-BWP in accordance with the scheduling information.

Example 4 (Corresponding to the Fourth Method)

The base station may schedule the msg3 in accordance with a specific frequency-domain range or BWP, and the terminal may transmit the msg3 within the specific frequency-domain range or BWP in accordance with the scheduling information from the base station. The specific frequency-domain range or BWP may be determined in different ways, e.g., a size of the frequency-domain range or BWP may be notified through the RRC signaling, or may be the same as that of the initial UL BWP.

A start RB index of the specific frequency-domain range or BWP may be the same as a lowest RB number of the PRACH resource for transmitting a corresponding preamble, and the corresponding preamble may be a preamble successfully received by the base station and indicating that the base station needs to perform acknowledgement in the RAR.

The specific frequency-domain range or BWP may be completely located within the active UL BWP for the terminal.

Based on the above, according to the schemes in the embodiments of the present disclosure, it is able to enable the terminal and the base station to understand the resource allocation for the msg3 in the CBRA process in a same manner through the explicit signaling or a mode predefined in a protocol. The base station may allocate the resources for the msg3 within the frequency-domain range or BWP, and the terminal may transmit the msg3 within the frequency-domain range or BWP in accordance with the scheduling information from the base station. Because the terminal and the base station understand the transmission and the reception of the msg3 in a same manner in the embodiments of the present disclosure, it is able to prevent, in a better manner, the occurrence of errors during the transmission and reception of the msg3 due to a resource allocation scheme of the msg3 in the CBRA process in the related art.

The present disclosure further provides in some embodiments a base station, including a memory, a processor, a transceiver, and a computer program stored in the memory and executed by the processor. The processor is configured to execute the computer program so as to determine resource allocation information of an msg3 in a CBRA process. The resource allocation information may be determined by the base station in accordance with a predefined rule, or configured by the base station and notified by the base station through the transceiver to the terminal. When the resource allocation information is determined in accordance with the predefined rule, a same predefined rule may be used by the base station and the terminal.

According to the embodiments of the present disclosure, the base station may determine the resource allocation information of the msg3 in the CBRA process. The resource allocation information may be determined by the base station in accordance with a predefined rule, or configured and notified by the base station to the terminal. When the resource allocation information is determined in accordance with the predefined rule, a same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

Figure 7:
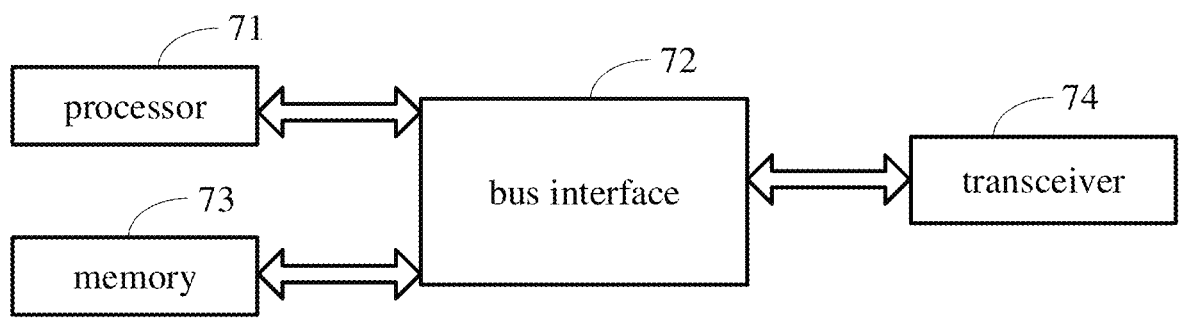
FIG. 7 is a schematic view showing a base station according to an embodiment of the present disclosure.

To be specific, as shown in FIG. 7, the base station in the embodiments of the present disclosure may include a processor 71, and a memory 73 connected to the processor 71 via a bus interface 72 and storing therein programs and data for the operation of the processor 71. The processor 71 is configured to call and execute the programs and data stored in the memory 73, so as to determine resource allocation information of an msg3 in a CBRA process. The resource allocation information may be determined by the terminal in accordance with a predefined rule, or configured by the base station and notified by the base station through a transceiver 74 to the terminal. When the resource allocation information is determined in accordance with the predefined rule, a same predefined rule may be used by the base station and the terminal.

The transceiver 74 may be connected to the bus interface 72, so as to receive and transmit data under the control of the processor 71.

It should be appreciated that, in FIG. 7, bus architecture may include a number of buses and bridges connected to each other, so as to connect various circuits for one or more processors represented by the processor 71 and one or more memories represented by the memory 73. In addition, as is known in the art, the bus architecture may be used to connect various other circuits, such as a circuit for a peripheral device, a circuit for a voltage stabilizer and a power management circuit, which will not be further described herein. The bus interface may be provided, and the transceiver 74 may include a plurality of elements, i.e., a transmitter and a receiver for communication with various other devices over a transmission medium. The processor 71 may take charge of managing the bus architecture as well as general processings. The memory 73 may store therein data for the operation of the processor 71.

A person skilled in the art understands that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

The operations executed by the processor will be described hereinafter in conjunction with, but not limited to, the following four examples.

In a first example, the processor is further configured to determine a transmission BWP for the msg3 in accordance with an initial UL BWP, and an active UL BWP configured for the terminal may include an entirety of the initial UL BWP.

In a second example, the processor is further configured to determine a frequency-domain range or a BWP for scheduling and transmitting the msg3 in accordance with configurations of the initial UL BWP and an active BWP and a configuration of a PRACH resource.

The processor is further configured to, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, schedule the msg3 in accordance with the initial UL BWP. To be specific, the active UL BWP configured for the terminal may include an entirety of the initial UL BWP.

More specifically, the active UL BWP configured for the terminal including the entirety of the initial UL BWP is the active UL BWP configured for all the terminals that have the completely coincided PRACH resources and belong to the same preamble group, wherein the active UL BWP includes the entirety of the initial UL BWP.

In addition, the processor is further configured to, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, schedule the msg3 in accordance with a preset BWP. The preset BWP may be a BWP that has a same size as the initial UL BWP and starts from a lowest PRB index of the active UL BWP; or the preset BWP may be the active UL BWP; or the preset BWP may have a same size as the initial UL BWP and start from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured for the terminal may not include an entirety of the initial UL BWP.

In a third example, the processor is further configured to notify the terminal of the frequency-domain range or the BWP for scheduling and transmitting the msg3 through the RRC signaling.

In addition, the processor is further configured to configure for the terminal the PRACH resource, and configure for the terminal the corresponding frequency-domain range or BWP for transmitting the msg3.

The frequency-domain range or the BWP may be included in the active UL BWP for the terminal.

To be specific, for the same PRACH resource configured for different terminals, the frequency-domain range or the BWP may be located at a same position in a carrier.

In a fourth example, the processor is further configured to schedule the msg3 in accordance with a preset frequency-domain range or BWP. A size of the preset frequency-domain range or BWP may be notified through explicit signaling or predefined in a protocol; and/or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble is a preamble that is successfully received by the base station and notifies the base station to perform corresponding acknowledgement in an RAR.

When the size of the preset frequency-domain range or BWP is notified through the explicit signaling or predefined in a protocol, the size of the preset frequency-domain range or BWP is notified through RRC signaling, or the size of the preset frequency-domain range or BWP is the same as the initial UL BWP, or the size of the preset frequency-domain range or BWP is another preset value.

The above embodiments about the uplink resource allocation method at the base station side may also be applied to the embodiments about the base station with a same technical effect.

The present disclosure further provides in some embodiments a terminal, including a memory, a processor, a transceiver, and a computer program stored in the memory and executed by the processor. The processor is configured to execute the computer program so as to determine resource allocation information of an msg3 in a CBRA process. The resource allocation information may be determined by the terminal in accordance with a predefined rule, or configured and notified by a base station. When the resource allocation information is determined in accordance with the predefined rule, a same predefined rule may be used by the base station and the terminal.

According to the embodiments of the present disclosure, the terminal may determine the resource allocation information of the msg3 in the CBRA process. The resource allocation information may be determined by the terminal in accordance with the predefined rule, or the resource allocation information is configured by the base station, and notified by the base station to the terminal. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

Figure 8:
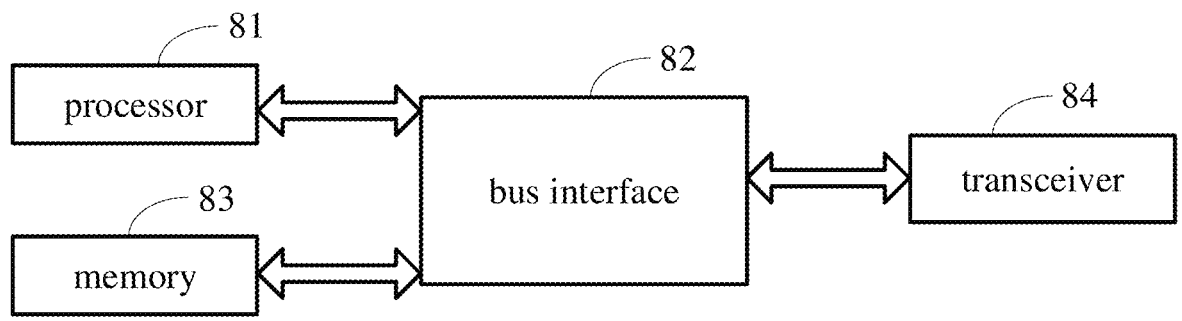
FIG. 8 is a schematic view showing a terminal according to an embodiment of the present disclosure.

To be specific, as shown in FIG. 8, the terminal in the embodiments of the present disclosure may include a processor 81, and a memory 83 connected to the processor 81 via a bus interface 82 and storing therein programs and data for the operation of the processor 81. The processor 81 is configured to call and execute the programs and data stored in the memory 83, so as to determine resource allocation information of an msg3 in a CBRA process. The resource allocation information may be determined by the terminal in accordance with a predefined rule, or configured by the base station and notified by the base station through a transceiver 84 to the terminal. When the resource allocation information is determined in accordance with the predefined rule, a same predefined rule may be used by the base station and the terminal.

In FIG. 8, bus architecture may include a number of buses and bridges connected to each other, so as to connect various circuits for one or more processors represented by the processor 81 and one or more memories represented by the memory 83. In addition, as is known in the art, the bus architecture may be used to connect various other circuits, such as a circuit for a peripheral device, a circuit for a voltage stabilizer and a power management circuit, which will not be further described herein. The bus interface may be provided, and the transceiver 84 may comprise a plurality of elements, i.e., a transmitter and a receiver for communication with various other devices over a transmission medium. With respect to different terminals, a user interface may also be provided for devices which are to be arranged inside or outside the UE, and these devices may include but not limited to a keypad, a display, a speaker, a microphone and a joystick. The processor 81 may take charge of managing the bus architecture as well as general processings. The memory 83 may store therein data for the operation of the processor 81.

A person skilled in the art understands that, all of, or parts of, the steps may be implemented through hardware, or implemented through relevant hardware under the control of a computer program. The computer program may include instructions for executing parts of, or all of, the steps of the method, and it may be stored in a computer-readable storage medium, e.g., a volatile or non-volatile storage medium in any form.

The operations executed by the processor will be described hereinafter in conjunction with, but not limited to, the following four examples (corresponding to the above four examples of the operations executed by the processor at the base station side).

In a first example, the processor is further configured to transmit through the transceiver the msg3 in accordance with UL grant information carried in an RAR within an initial UL BWP.

In a second example, the processor is further configured to determine a frequency-domain range or a BWP for scheduling and transmitting the msg3 in accordance with configurations of the initial UL BWP and an active BWP and a configuration of a PRACH resource.

The processor is further configured to, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmit the msg3 within an initial BWP in accordance with the UL grant information transmitted by the base station. To be specific, the active UL BWP may include an entirety of the initial UL BWP.

The processor is further configured to, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmit the msg3 on a preset BWP in accordance with the UL grant information transmitted by the base station. The preset BWP may has a same size as the initial UL BWP and starts from a lowest PRB index of the active UL BWP; or the preset BWP may be the active UL BWP; or the preset BWP may have a same size as the initial UL BWP and start from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured by the base station for the terminal may not include an entirety of the initial UL BWP.

In a third example, the processor is further configured to determine the frequency-domain range or the BWP for scheduling and transmitting the msg3 through the RRC signaling.

The frequency-domain range or the BWP for transmitting the msg3 may be configured correspondingly by the base station when the PRACH resource is configured by the base station for the terminal.

To be specific, the frequency-domain range or the BWP may be included in the active UL BWP for the terminal.

In a fourth example, the processor is further configured to transmit through the transceiver the msg3 in accordance with scheduling of the base station within a preset frequency-domain range or BWP. A size of the preset frequency-domain range or BWP may be notified through explicit signaling or predefined in a protocol; or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble is a preamble that is successfully received by the base station and notifies the base station to perform corresponding acknowledgement in the RAR.

When the size of the preset frequency-domain range or BWP is notified through the explicit signaling or predefined in a protocol, the size of the preset frequency-domain range or BWP may be notified through RRC signaling, or the size of the preset frequency-domain range or BWP may be the same as the initial UL BWP, or the size of the preset frequency-domain range or BWP may be another preset value.

The above embodiments about the uplink resource allocation method at the terminal side may also be applied to the embodiments about the terminal with a same technical effect.

The present disclosure further provides in some embodiments a computer-readable storage medium storing therein a computer program. The computer program is executed by a processor, so as to implement the above uplink resource allocation method at the base station side or the above uplink resource allocation method at the terminal side.

Correspondingly, the above embodiments about the uplink resource allocation method at the base station side or the terminal side may also be applied to the embodiments about the computer-readable storage medium with a same technical effect.

Figure 9:
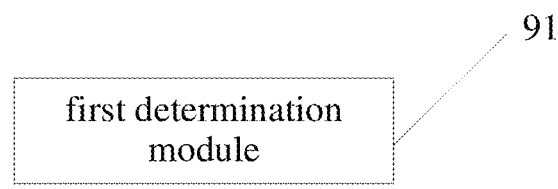
FIG. 9 is a schematic view showing an uplink resource allocation device according to an embodiment of the present disclosure.

The present disclosure further provides in some embodiments an uplink resource allocation device (for a base station) which, as shown in FIG. 9, includes: a first determination module 91 configured to determine resource allocation information of an msg3 in a CBRA process. The resource allocation information may be determined by the base station in accordance with a predefined rule, or configured by the base station and notified by the base station to a terminal. When the resource allocation information is determined in accordance with the predefined rule, a same predefined rule may be used by the base station and the terminal.

According to the embodiments of the present disclosure, the uplink resource allocation device may determine the resource allocation information of the msg3 in the CBRA process. The resource allocation information may be determined by the terminal in accordance with the predefined rule, or the resource allocation information is configured by the base station, and notified by the base station to the terminal. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

The first determination module 91 will illustratively described hereinafter in conjunction with, but not limited to, the following four examples.

In a first example, the first determination module may include a first processing sub-module configured to determine a transmission BWP for the msg3 in accordance with an initial UL BWP, and an active UL BWP configured for the terminal may include an entirety of the initial UL BWP.

In a second example, the first determination module may include a first determination sub-module configured to determine a frequency-domain range or a BWP for scheduling and transmitting the msg3 in accordance with configurations of the initial UL BWP and an active BWP and a configuration of a PRACH resource.

The first determination sub-module may include a first processing unit configured to, when a PRACH resource configured for the terminal within the active UL BWP completely coincides with a PRACH resource configured for the terminal within the initial UL BWP, the preamble is transmitted by the terminal on the PRACH resource and the preamble belongs to a preamble group configured on the initial UL BWP, schedule the msg3 in accordance with the initial UL BWP. To be specific, the active UL BWP configured for the terminal may include an entirety of the initial UL BWP.

More specifically, the active UL BWP configured for the terminal including the entirety of the initial UL BWP is the active UL BWP configured for all the terminals that have the completely coincided PRACH resources and belong to the same preamble group, wherein the active UL BWP includes the entirety of the initial UL BWP.

The first determination sub-module may further include a second processing unit configured to, when the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, schedule the msg3 in accordance with a preset BWP. The preset BWP may be a BWP that has a same size as the initial UL BWP and starts from a lowest PRB index of the active UL BWP; or the preset BWP may be the active UL BWP; or the preset BWP may have a same size as the initial UL BWP and start from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured for the terminal may not include an entirety of the initial UL BWP.

In a third example, the first determination module may include a second processing sub-module configured to notify the terminal of the frequency-domain range or the BWP for scheduling and transmitting the msg3 through the RRC signaling.

In addition, the uplink resource allocation device may further include a first processing module configured to configure for the terminal the PRACH resource, and configure for the terminal the corresponding frequency-domain range or BWP for transmitting the msg3.

The frequency-domain range or the BWP may be included in the active UL BWP for the terminal.

To be specific, for the same PRACH resource configured for different terminals, the frequency-domain range or the BWP may be located at a same position in a carrier.

In a fourth example, the first determination module may include a third processing sub-module configured to schedule the msg3 in accordance with a preset frequency-domain range or BWP. A size of the preset frequency-domain range or BWP may be notified through explicit signaling or predefined in a protocol; and/or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble may be a preamble successfully received by the base station and indicating the base station to perform corresponding acknowledgement in an RAR.

When the size of the preset frequency-domain range or BWP is notified through the explicit signaling or predefined in a protocol, the size of the preset frequency-domain range or BWP may be notified through RRC signaling, or the size of the preset frequency-domain range or BWP may be the same as the initial UL BWP, or the size of the preset frequency-domain range or BWP may be any other preset value.

The above embodiments about the uplink resource allocation method at the base station side may also be applied to the embodiments about the uplink resource allocation device with a same technical effect.

Figure 10:
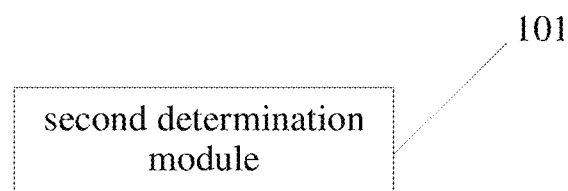
FIG. 10 is another schematic view the showing uplink resource allocation device according to an embodiment of the present disclosure.

The present disclosure further provides in some embodiments an uplink resource allocation device (for a terminal) which, as shown in FIG. 10, includes a second determination module 101 configured to determine resource allocation information of an msg3 in a CBRA process. The resource allocation information may be determined by the terminal in accordance with a predefined rule, or configured and notified by a base station. When the resource allocation information is determined in accordance with the predefined rule, a same predefined rule may be used by the base station and the terminal.

According to the embodiments of the present disclosure, the uplink resource allocation device may determine the resource allocation information of the msg3 in the CBRA process. The resource allocation information may be determined by the terminal in accordance with the predefined rule, or the resource allocation information is configured by the base station, and notified by the base station. When the resource allocation information is determined in accordance with the predefined rule, the same predefined rule may be used by the base station and the terminal. As a result, it is able to enable the terminal and the base station to understand the resource allocation for the msg3 in the CBRA process in a same manner through the explicit signaling or a mode predefined in a protocol, thereby to prevent the occurrence of errors during the transmission and reception of the msg3.

In the embodiments of the present disclosure, the second determination module 101 will be illustratively described hereinafter in conjunction with, but not limited to, the following four examples (corresponding to the four examples about the first determination module 91).

In a first example, the second determination module may include a fourth processing sub-module configured to transmit the msg3 in accordance with UL grant information carried in an RAR within an initial UL BWP.

In a second example, the second determination module may include a second determination sub-module configured to determine a frequency-domain range or a BWP for scheduling and transmitting the msg3 in accordance with configurations of the initial UL BWP and an active BWP and a configuration of a PRACH resource.

The second determination sub-module may include a third processing unit configured to, when a PRACH resource configured by the base station for the terminal within an active UL BWP completely coincides with a PRACH resource configured by the base station for the terminal within the initial UL BWP, the preamble is transmitted by the terminal on the PRACH resource and the preamble belongs to a preamble group configured on the initial UL BWP, transmit the corresponding msg3 within an initial BWP in accordance with the UL grant information transmitted by the base station. To be specific, the active UL BWP may include an entirety of the initial UL BWP.

In addition, the second determination sub-module may further include a fourth processing unit configured to, when the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmit the msg3 on a preset BWP in accordance with the UL grant information transmitted by the base station. The preset BWP may be a BWP that has a same size as the initial UL BWP and starts from a lowest PRB index of the active UL BWP; or the preset BWP may be the active UL BWP; or the preset BWP has a same size as the initial UL BWP and starts from a lowest PRB index of the PRACH resource on which the preamble is transmitted by the terminal; or the preset BWP may has a same size as the initial UL BWP with a determined PRB index indicated by RRC signaling as a start point of the preset BWP, or the preset BWP may be an UL BWP indicated by the RRC signaling for scheduling the msg3 by the base station and transmitting the msg3 by the terminal, and the BWP may be completely included in the active UL BWP. To be specific, the active UL BWP configured by the base station for the terminal may not include an entirety of the initial UL BWP.

In a third example, the second determination module may include a fifth processing sub-module configured to determine the frequency-domain range or the BWP for scheduling and transmitting the msg3 through the RRC signaling.

The frequency-domain range or the BWP for transmitting the msg3 may be configured correspondingly by the base station when the PRACH resource is configured by the base station for the terminal.

To be specific, the frequency-domain range or the BWP may be included in the active UL BWP for the terminal.

In a fourth example, the second determination module may include a sixth processing sub-module configured to transmit the msg3 in accordance with scheduling of the base station within a preset frequency-domain range or BWP. A size of the preset frequency-domain range or BWP may be notified through explicit signaling or predefined in a protocol; or a start RB index of the preset frequency-domain range or BWP may be the same as a lowest RB number of the PRACH resource for transmitting the corresponding preamble. The preset frequency-domain range or BWP may be completely located in the active UL BWP for the terminal.

To be specific, when the start RB index of the preset frequency-domain range or BWP is the same as the lowest RB number of the PRACH resource for transmitting the corresponding preamble, the preamble may be a preamble successfully received by the base station and indicating the base station to perform corresponding acknowledgement in the RAR.

When the size of the preset frequency-domain range or BWP is notified through the explicit signaling or predefined in a protocol, the size of the preset frequency-domain range or BWP may be notified through RRC signaling, or the size of the preset frequency-domain range or BWP may be the same as the initial UL BWP, or the size of the preset frequency-domain range or BWP may be another preset value.

The above embodiments about the uplink resource allocation method at the terminal side may also be applied to the embodiments about the uplink resource allocation device with a same technical effect.

It should be appreciated that, the functional members described in the specification may be referred to as modules, sub-modules or units, so as to emphasize the independence of the implementation in a more particular manner.

In the embodiments of the present disclosure, the modules or units may be implemented by software, so as to be executed by various processors. For example, an identified, executable code module may include one or more physical or logical blocks including computer instructions, and the module may be constructed as an object, a process or a function. Even so, the executable codes of the identified modules are unnecessary to be physically located together, but may include different instructions stored at different locations. When these instructions are logically combined together, they may form the modules and achieve the prescribed purposes of the modules.

Actually, the executable code module may be a single instruction or a plurality of instructions, and may even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level in the related art, a person skilled in the art can build a corresponding hardware circuit to achieve the corresponding function if taking no account of the cost, i.e., the module implemented by the software may also be implemented by the hardware circuit. The hardware circuit includes a conventional Very-Large-Scale Integration (VLSI) circuit, a gate array, a semiconductor such as a logic chip and a transistor, or other discrete components in the related art. The modules may further be implemented by a programmable hardware device, such as a field-programmable gate array, a programmable array logic device and a programmable logic device.

The above are optional embodiments of the present disclosure, a person skilled in the art may make further modifications and improvements without departing from the principle of the present disclosure, and these modifications and improvements shall also fall within the scope of the present disclosure.

What is claimed is:

1. An uplink resource allocation method, comprising:
    determining resource allocation information of an msg3 in a Contention-Based Random Access (CBRA) process, wherein the resource allocation information is determined by a base station in accordance with a predefined rule; or the resource allocation information is configured by the base station, and notified by the base station to a terminal;
    in response to determining the resource allocation information is determined in accordance with the predefined rule, the same predefined rule is used by the base station and the terminal,
    wherein the determining the resource allocation information of the msg3 in the CBRA process comprises:
    determining a transmission Bandwidth Part (BWP) for the msg3 in accordance with an initial Uplink (UL) BWP, wherein an active UL BWP configured for the terminal comprises an entirety of the initial UL BWP, and the msg3 is transmitted by the terminal on the active UL BWP.

2. The uplink resource allocation method according to claim 1, wherein the determining the resource allocation information of the msg3 in the CBRA process comprises:
    determining a frequency-domain range or a BWP for scheduling and transmitting the msg3 in accordance with a configuration of the initial UL BWP, a configuration of an active BWP and a configuration of a Physical Random Access Channel (PRACH) resource.

3. The uplink resource allocation method according to claim 2, wherein the determining the frequency-domain range or the BWP for scheduling and transmitting the msg3 in accordance with the configuration of the initial UL BWP, the configuration of the active BWP and the configuration of the PRACH resource comprises:
    in response to determining a PRACH resource configured for the terminal within the active UL BWP completely coincides with a PRACH resource configured for the terminal within the initial UL BWP, and the preamble is transmitted by the terminal on the PRACH resource, and the preamble belongs to a preamble group configured on the initial UL BWP, scheduling the msg3 in accordance with the initial UL BWP.

4. The uplink resource allocation method according to claim 2, wherein the determining the frequency-domain range or the BWP for scheduling and transmitting the msg3 in accordance with the configuration of the initial UL BWP, the configuration of the active BWP and the configuration of the PRACH resource further comprises:
    in response to determining the PRACH resource configured for the terminal within the active UL BWP does not completely coincide with the PRACH resource configured for the terminal within the initial UL BWP, and/or the preamble is transmitted by the terminal on the PRACH resource and the preamble does not belong to the preamble group configured on the initial UL BWP, scheduling the msg3 in accordance with a preset BWP,
    wherein the preset BWP has a same size as the initial UL BWP and starts from a lowest Physical Resource Block (PRB) index of the active UL BWP; or
    the preset BWP is the active UL BWP; or
    the preset BWP has a same size as the initial UL BWP and starts from a lowest PRB index of the PRACH resource on which the preamble is transmitted by the terminal; or
    the preset BWP has a same size as the initial UL BWP, and a start point of the preset BWP is a determined PRB index indicated by Radio Resource Control (RRC) signaling; or the preset BWP is an UL BWP indicated by the RRC signaling, the UL BWP is used for scheduling the msg3 by the base station and transmitting the msg3 by the terminal; wherein the BWP is completely comprised in the active UL BWP.

5. The uplink resource allocation method according to claim 1, wherein the active UL BWP configured for the terminal comprising the entirety of the initial UL BWP is:
    the active UL BWP configured for all the terminals that have the completely coincided PRACH resources and belong to the same preamble group, wherein the active UL BWP comprises the entirety of the initial UL BWP.

6. The uplink resource allocation method according to claim 1, wherein the determining the resource allocation information of the msg3 in the CBRA process comprises:
    notifying the terminal of the frequency-domain range or the BWP for scheduling and transmitting the msg3 through the RRC signaling,
    wherein the uplink resource allocation method further comprises:
    configuring for the terminal the PRACH resource, and configuring for the terminal the corresponding frequency-domain range or BWP for transmitting the msg3,
    wherein the frequency-domain range or the BWP is comprised in the active UL BWP for the terminal;
    for the same PRACH resources configured for different terminals, the frequency-domain ranges or the BWPs are located at a same position in a carrier.

7. The uplink resource allocation method according to claim 1, wherein the determining the resource allocation information of the msg3 in the CBRA process comprises:
    scheduling the msg3 in accordance with a preset frequency-domain range or BWP, wherein a size of the preset frequency-domain range or BWP is notified through explicit signaling or predefined in a protocol; and/or
a start Resource Block (RB) index of the preset frequency-domain range or BWP is the same as a lowest RB number of the PRACH resource for transmitting the corresponding preamble,
wherein the preset frequency-domain range or BWP is completely located in the active UL BWP for the terminal,
wherein in response to determining the start RB index of the preset frequency-domain range or BWP is the same as the lowest RB number of the PRACH resource for transmitting the corresponding preamble,
the preamble is a preamble that is successfully received by the base station and notifies the base station to perform corresponding acknowledgement in a Random Access Response (RAR).

8. The uplink resource allocation method according to claim 7, wherein in response to determining the size of the preset frequency-domain range or BWP is notified through the explicit signaling or predefined in a protocol,
the size of the preset frequency-domain range or BWP is notified through RRC signaling; or
the size of the preset frequency-domain range or BWP is the same as the initial UL BWP; or
the size of the preset frequency-domain range or BWP is another preset value.

9. An uplink resource allocation method, comprising:
determining resource allocation information of an msg3 in a CBRA process,
wherein the resource allocation information is determined by a terminal in accordance with a predefined rule; or the resource allocation information is configured and notified by a base station;
in response to determining the resource allocation information is determined in accordance with the predefined rule, the same predefined rule is used by the base station and the terminal,
wherein the determining the resource allocation information of the msg3 in the CBRA process comprises:
determining a frequency-domain range or a BWP for scheduling and transmitting the msg3 in accordance with a configuration of the initial UL BWP, a configuration of an active BWP and a configuration of a PRACH resource,
wherein the determining the frequency-domain range or the BWP for scheduling and transmitting the msg3 in accordance with the configuration of the initial UL BWP, the configuration of the active BWP and the configuration of the PRACH resource comprises:
in response to determining a PRACH resource configured by the base station for the terminal within an active UL BWP completely coincides with a PRACH resource configured by the base station for the terminal within the initial UL BWP, and the preamble is transmitted by the terminal on the PRACH resource, and the preamble belongs to a preamble group configured on the initial UL BWP, transmitting the corresponding msg3 within an initial BWP in accordance with the UL grant information transmitted by the base station.

10. The uplink resource allocation method according to claim 9, wherein the determining the resource allocation information of the msg3 in the CBRA process comprises:
transmitting the msg3 in accordance with UL grant information carried in an RAR within an initial UL BWP.

11. The uplink resource allocation method according to claim 9, wherein the active UL BWP comprises an entirety of the initial UL BWP.

12. The uplink resource allocation method according to claim 9, wherein the determining the frequency-domain range or the BWP for scheduling and transmitting the msg3 in accordance with the configuration of the initial UL BWP, the configuration of the active BWP and the configuration of the PRACH resource further comprises:
in response to determining the PRACH resource configured by the base station for the terminal within the active UL BWP does not completely coincide with the PRACH resource configured by the base station for the terminal within the initial UL BWP, and/or the preamble is transmitted by the terminal on the PRACH resource and the preamble does not belong to the preamble group configured on the initial UL BWP, transmitting the msg3 on a preset BWP in accordance with the UL grant information transmitted by the base station,
wherein the preset BWP has a same size as the initial UL BWP and starts from a lowest PRB index of the active UL BWP; or
the preset BWP is the active UL BWP; or
the preset BWP has a same size as the initial UL BWP and starts from a lowest PRB index of the PRACH resource on which the preamble is transmitted by the terminal; or
the preset BWP has a same size as the initial UL BWP, and a start point of the preset BWP is a determined PRB index indicated by RRC signaling; or the preset BWP is an UL BWP indicated by the RRC signaling, the UL BWP is used for scheduling the msg3 by the base station and transmitting the msg3 by the terminal; wherein the BWP is completely comprised in the active UL BWP.

13. The uplink resource allocation method according to claim 12, wherein the active UL BWP configured by the base station for the terminal does not comprise an entirety of the initial UL BWP.

14. A terminal, comprising a memory, a processor, a transceiver, and a computer program stored in the memory and executed by the processor, wherein the processor is configured to execute the computer program to implement the uplink resource allocation method according to claim 9.

15. A base station, comprising a memory, a processor, a transceiver, and a computer program stored in the memory and executed by the processor, wherein the processor is configured to execute the computer program to:
determine resource allocation information of an msg3 in a CBRA process,
wherein the resource allocation information is determined by a base station in accordance with a predefined rule; or the resource allocation information is configured by the base station, and notified by the base station to a terminal through the transceiver;
in response to determining the resource allocation information is determined in accordance with the predefined rule, the same predefined rule is used by the base station and the terminal,
wherein the determining the resource allocation information of the msg3 in the CBRA process comprises:
determining a transmission BWP for the msg3 in accordance with an initial UL BWP, wherein an active UL BWP configured for the terminal comprises an entirety of the initial UL BWP, and the msg3 is transmitted by the terminal on the active UL BWP.

* * * * *